INVENTOR.
Frank J. Bartosz
BY
William P. Stewart
ATTORNEY

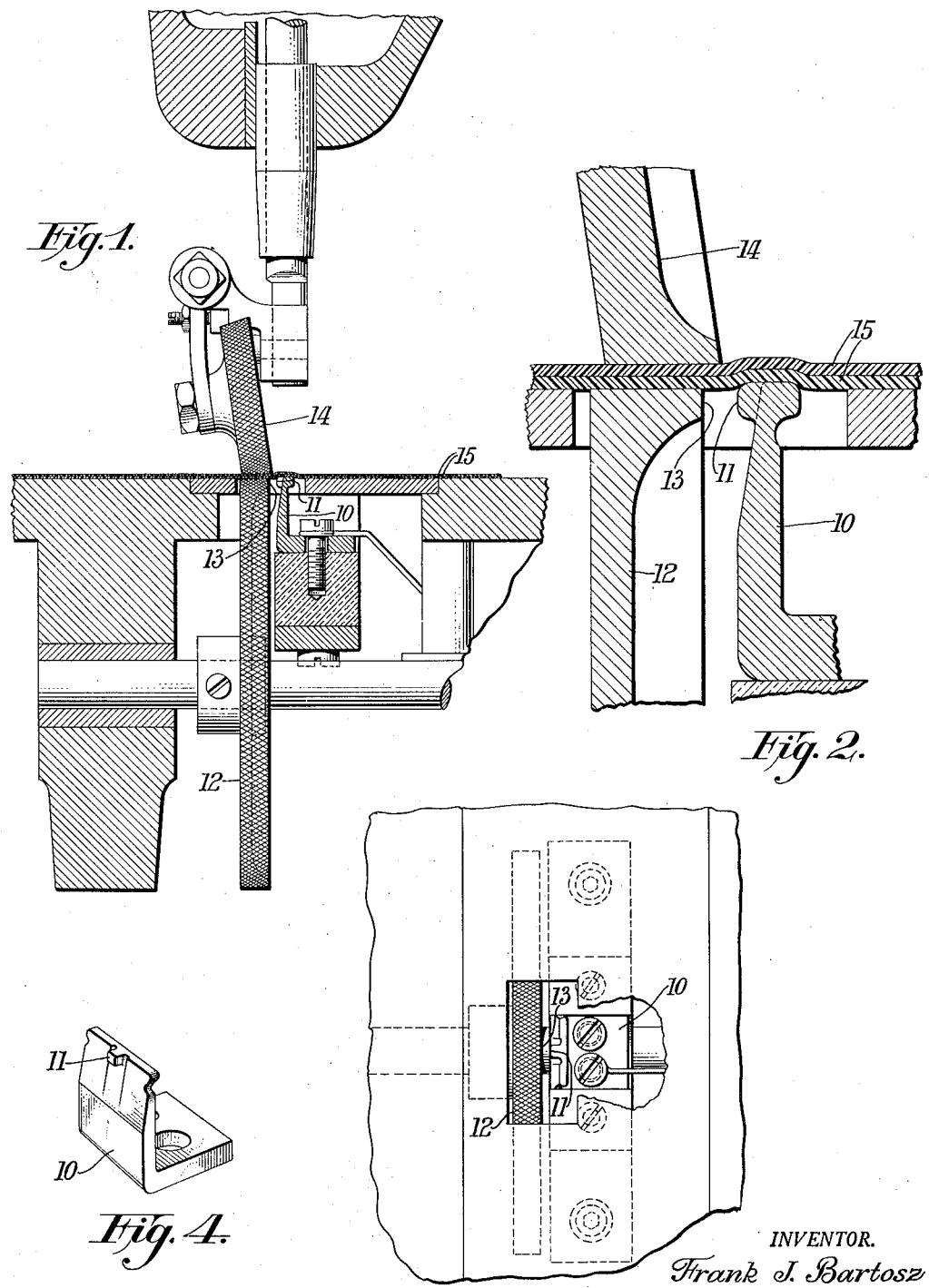

2,796,912

SEALING DIELECTRIC MATERIALS BY THE APPLICATION OF A RADIO-FREQUENCY ARC

Frank J. Bartosz, Cranford, N. J., assignor to The Singer Manufacturing Company, Elizabeth, N. J., a corporation of New Jersey Application November 12, 1952, Serial No. 319,939

12 Claims. (Cl. 154—42)

This invention relates to the sealing of dielectric material by the heat transferred thereto from an adjacent radio-frequency arc. It is of special utility as applied to the sealing of polyethylene sheet material which has heretofore been difficult to seal satisfactorily by heat sealing with an ordinary heated electrode due to the great tendency for the material, in the molten state, to stick to the electrode. This has led to the general use of a slip-sheet, which may be a piece of cellophane or paper, placed temporarily as a shield between the electrode and the polyethylene to prevent sticking and which is stripped off after the seal is made. The added complication of the slip-sheet is, of course, not desirable.

The very good insulating value of polyethylene at radio-frequencies makes it very difficult to effect good seals by the application thereto of radio-frequency fields.

One of the objects of this invention is to provide a novel method of heating and sealing dielectric thermoplastic materials by the use of the heat energy in a radio-frequency arc.

Another object of this invention is to direct and control a continuous arc of radio-frequency energy in the vicinity of superposed plies of dielectric thermoplastic material to cause fusion and consolidation of said plies along a predetermined seam line.

A further object of this invention is to provide a novel, simple, and convenient method and apparatus for sealing polyethylene sheet material under conditions wherein the material is progressively fed past an arc-heated, pressure-applying, sealing region.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

In the drawings, Fig. 1 is a vertical section taken through part of a machine embodying the invention.

Fig. 2 is an enlarged view of a portion of Fig. 1.

Fig. 3 is a plan view of the machine of Fig. 1 with the cover plate broken away to show the arrangement of the lower electrode.

Fig. 4 is a perspective view showing the features of the lower electrode.

Figure 5:
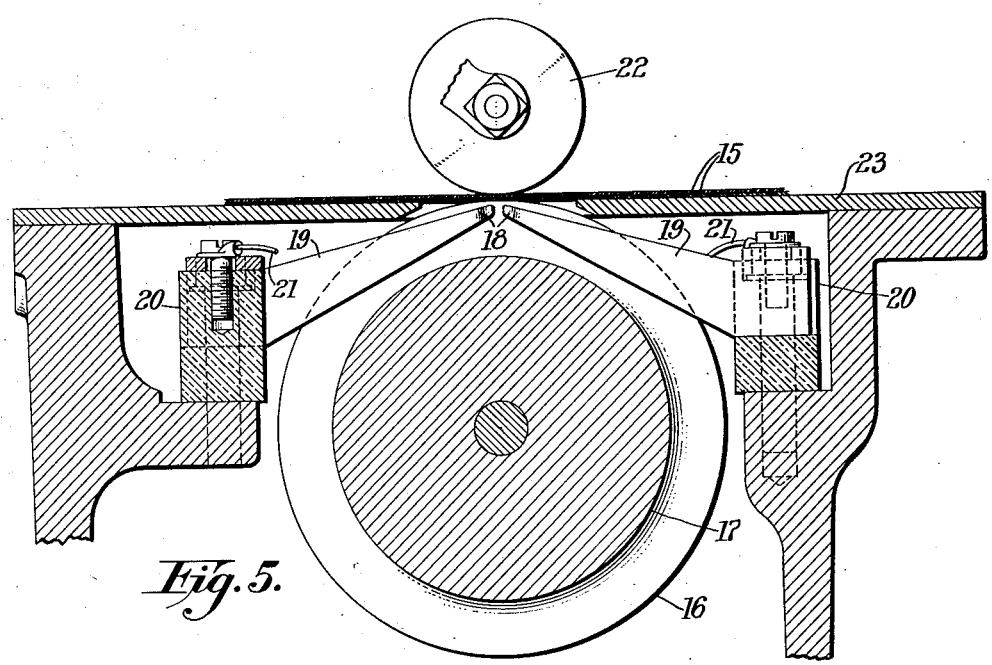
Fig. 5 is a transverse section taken through a machine modified from that of Fig. 1.

Referring to Fig. 1, there are shown the electrodes and feeding elements according to the invention, which, it is pointed out, are very similar to those shown and described in the U. S. Patent No. 2,432,412 of H. Hacklander, December 9, 1947, to which reference may be had for a more complete description of the machine.

As compared with the machine of the prior art noted above, the machine herein to be described preferably has no upper electrode; the lower electrode 10 is provided with an arc-forming beak 11 positioned to face a metallic, dished feed wheel 12 in proximity to a peripheral edge 13 thereof; and a roller presser 14 is laterally displaced slightly in the direction of the electrode 10. These changes are designed to produce a continuous arc stream between the beak 11 of the electrode 10 and the peripheral edge 13 of the feed wheel 12 on one side of and closely adjacent to superposed work plies 15—15 being fed through the machine by the cooperative action of the lower feed wheel 12 and the upper roller presser 14. It will be noted that the feed wheel 12 serves simultaneously the dual function of a rotatable electrode and a feeding element. As a rotatable electrode cooperating with the stationary electrode 10 in an arc-forming capacity, the element 12 is somewhat unusual in that it continually presents a different surface to the arc stream as it rotates, with the very beneficial result that this element 12 does not heat itself appreciably; and thus has a very long useful life and does not stick to the work plies as would normally be the case for a heated electrode in pressure contact therewith. The feed wheel 12, being metallic and connected to the machine frame which forms the grounded side of the radio-frequency energy supply, forms with electrode 10, which is connected to the other side of said supply, a pair of arc-forming elements.

Figure 7:
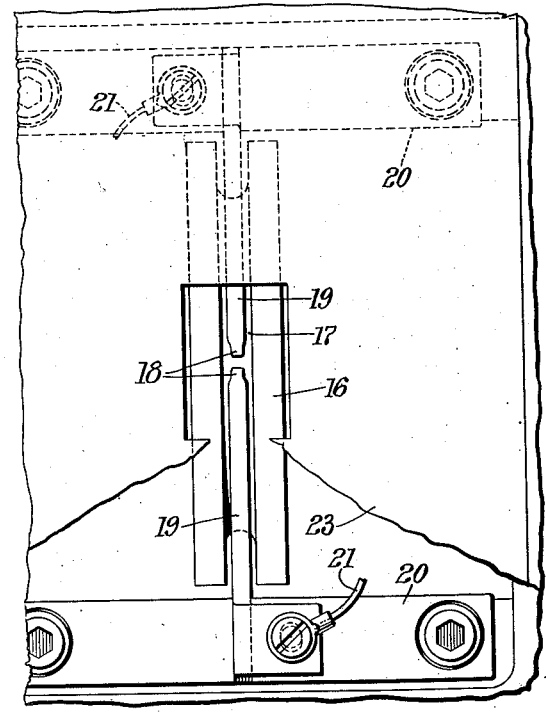
Fig. 7 is a plan view of the machine of Fig. 5 with the cover plate broken away to show the arrangement of the electrodes.
Figure 6:
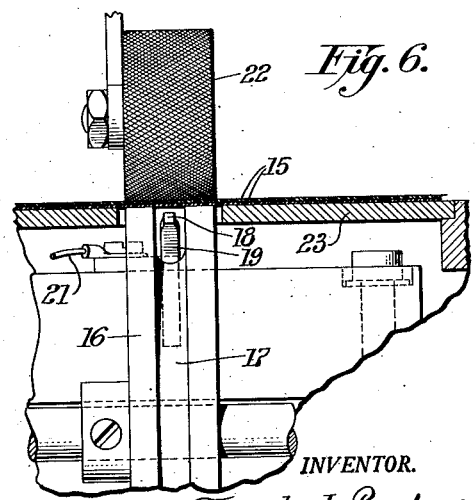
Fig. 6 is a longitudinal section through a portion of the machine of Fig. 5.

It will be seen, especially by reference to Fig. 3, that the direction of the arc stream is transverse to the direction of feed, but it is to be understood that the present invention is not to be construed as so limited, but includes within its scope a construction and method in which the arc stream has a direction parallel to the direction of feed. This is shown in Figs. 5, 6 and 7 wherein an insulated feed wheel 16 is formed with a deeply grooved portion 17 in its periphery to provide an unobstructed path adjacent the plies 15—15 on one side thereof and in a direction paralleling the direction of feed. An arc stream is formed along this path between the end portions 18—18 of stationary electrodes 19—19 mounted at either end thereof on slotted insulating blocks 20—20, and electrically connected to a source of radio-frequency energy (not shown) by conducting wires 21—21. Feed of the material plies 15—15 is effected in the direction of the arc stream by the coaction of the feed wheel 16 and a cylindrical roller presser 22. A removable cover plate 23 gives access to the electrodes 19—19 for adjustment or renewal.

It has been found that, based on the relative stability of the arc, the ease of starting the arc and the safety for the operator, the most satisfactory source of energy for the arc is obtained from an electron tube oscillator operating substantially in the frequency range of from 50 to 100 megacycles per second. Another advantage of the use of radio-frequency energy is the fact that the metallic electrodes, due to the skin effect at these frequencies, do not heat themselves appreciably in the field created thereby.

The invention herein has been described, for simplicity, as being applied to the machine set forth in the U. S. Patent No. 2,432,412, which machine provides an intermittent progressive movement for the feed wheel. It was found, however, that somewhat better results could be obtained by driving the feed wheel 12 at a continuous rate of speed, by any suitable or conventional means, and this continuous feed shall be considered the preferred form of feed for the machine of this invention.

It will be understood that the material to be heated is, according to this invention, not interposed by design into the arc stream, such as in ordinary arc welding procedure, nor is the material purposely placed in a radio-frequency field such as in the case with inductive or dielectric-loss heating. In the present case, the material is merely exposed at short range to the heat of the arc and the energy is transferred by radiation, conduction and convection; and it is not necessary nor desirable for the arc to come into physical contact with the material.

It has been found beneficial to arrange the elements with the roller-pressure 14 displaced laterally with respect to the feed wheel 12 by a small amount in the direction of the electrode 10 as clearly shown in Fig. 2. Tests have shown that best results are obtained with the top of the electrode 10 positioned slightly above the top of the feed wheel 12. This is shown in Figs. 1 and 2, and it appears that this arrangement helps in the formation of a thicker bead at the seam line due to better flow of the material, thus making the seam as strong as or stronger than the material itself.

With regard to the actual results obtained by the method and apparatus described above, it has been possible to produce excellent continuous seams joining two plies of 2 mil polyethylene sheet material at a feed rate of 60 feet per minute and two plies of 4 mil polyethylene sheet material at a feed rate of 20 feet per minute. Also four plies of 2 mil polyethylene sheet material have been seamed at a rate of 20 feet per minute.

Having thus set forth the nature of the invention what I claim herein is:

1. A method of heating a strip of dielectric material which comprises forming a continuous radio-frequency arc in a region adjacent to the surface of and in heat transferring proximity to said material and moving said material progressively past said arc.

2. A method of heat sealing which comprises superimposing plies of dielectric thermoplastic material, forming a continuous radio-frequency arc in a region adjacent and in heat transferring proximity to the outer surface of one of said plies, and continuously moving said superimposed plies, while under pressure, past said arc.

3. The method of sealing together plies of dielectric thermoplastic material comprising superimposing said plies, feeding them continuously past a region, applying continuous pressure to said plies in said region, and forming a continuous electric arc of radio-frequency adjacent to said region on one side of said material and in heat transferring proximity thereto whereby the plies are heated and fused together along a predetermined continuous seam line.

4. A machine for heat sealing work-plies of dielectric thermoplastic sheet materials, comprising, a work-support, work-feeding means, a pair of electrodes disposed in spark-gap spaced relation from each other at the same side of and in proximity to said work-plies, and a radio-frequency oscillator electrically connected to said electrodes.

5. A machine for heat sealing work-plies of dielectric thermoplastic sheet materials, comprising a work-support, work-feeding means, a pair of electrodes spaced from each other at the same side of and in proximity to said work-plies to form a spark-gap extending crosswise of the feed of said work-plies, and a radio-frequency oscillator electrically connected to said electrodes.

6. A machine for heat sealing work-plies of dielectric thermoplastic sheet materials, comprising, a work support, work-feeding means, a pair of electrodes spaced from each other at the same side of and in proximity to said work-plies to form a spark-gap extending in the direction of feed of said work-plies, and a radio-frequency oscillator electrically connected to said electrodes.

7. A machine for heat sealing work-plies of dielectric thermoplastic sheet materials, comprising, a work-support, a work-feeding means, a pair of electrodes disposed in spark-gap spaced relation from each other at the same side of and in proximity to said work-plies, a radio-frequency oscillator electrically connected to said electrodes, and means for rotating one of said electrodes.

8. A machine for heat sealing work-plies of dielectric thermoplastic sheet materials, comprising, a work-support, work-feeding means including a rotatable electrode, means for rotating said electrode, a stationary electrode disposed in spaced relation to and at the same side of said work-plies as the rotatable electrode, said stationary electrode being formed with an arc-forming beak directed toward and disposed adjacent to said rotatable electrode, and a source of radio-frequency voltage applied to said stationary and rotatable electrodes.

9. A machine for sealing together superimposed plies of dielectric thermoplastic material, comprising cooperating feeding elements positioned in contact with and on opposite sides of said plies of material, a stationary electrode positioned on one side of said material and closely adjacent to one of said feeding elements, and a source of radio-frequency voltage applied between the one of said feeding elements and said electrode on the same side of said material to produce a continuous electrical arc therebetween, whereby said plies are heated and fused together along a seam line as the material is advanced by the feeding elements.

10. A machine for heating and sealing work-plies of dielectric thermoplastic sheet materials, comprising a work-support, work-feeding means including a rotatable feed wheel having a peripheral groove, a pair of stationary electrodes disposed in spark-gap spaced relation from each other at the same side of and in proximity to said work-plies and aligned with respect to said feed wheel to support and direct a continuous arc stream through said groove between the feed-wheel and the work-plies, and a source of radio-frequency energy electrically connectible with said electrodes.

11. A method of heat sealing which comprises superimposing plies of dielectric thermoplastic material, forming a continuous radio-frequency arc in a region adjacent and in heat transferring proximity to the surface of one of said plies between a pair of spaced arc forming members, progressively feeding said plies with one of said arc forming members past the continuous arc while the plies are under pressure.

12. A method of heat sealing which comprises superimposing plies of dielectric thermoplastic material, forming a continuous radio-frequency arc in a region adjacent and in heat transferring proximity to the surface of one of said plies between a pair of spaced arc forming members, continuously feeding said plies with one of said arc forming members transversely past the continuous arc while the plies are under pressure.

References Cited in the file of this patent

UNITED STATES PATENTS

| | | |
|---|---|---|
| 2,422,525 | Brown et al. | June 17, 1947 |
| 2,459,234 | McDowall | Jan. 18, 1949 |
| 2,469,990 | Quayle et al. | May 10, 1949 |
| 2,506,626 | Zottu | May 9, 1950 |
| 2,539,646 | Welch | Jan. 30, 1951 |
| 2,562,146 | Hultkrans | July 24, 1951 |
| 2,606,850 | Piazze | Aug. 12, 1952 |
| 2,612,582 | Appleton | Sept. 30, 1952 |
| 2,625,201 | Smith | Jan. 13, 1953 |
| 2,679,469 | Bedford | May 25, 1954 |
| 2,686,556 | Gerber et al. | Aug. 17, 1954 |

FOREIGN PATENTS

| | | |
|---|---|---|
| 599,023 | Great Britain | Mar. 3, 1948 |